April 8, 1947.

I. H. SELDEN 2,418,793

ROTARY ABUTMENT INTERNAL COMBUSTION ENGINE WITH
INDEPENDENTLY ROTATING VALVE IN THE ABUTMENT

Filed March 16, 1943

Inventor
Irving H. Selden

Attorney

April 8, 1947.   I. H. SELDEN   2,418,793
ROTARY ABUTMENT INTERNAL COMBUSTION ENGINE WITH
INDEPENDENTLY ROTATING VALVE IN THE ABUTMENT
Filed March 16, 1943   6 Sheets-Sheet 3

Fig. 7.

Inventor
Irving H. Selden
By
Attorney

Fig. 8.

April 8, 1947.   I. H. SELDEN   2,418,793
ROTARY ABUTMENT INTERNAL COMBUSTION ENGINE WITH
INDEPENDENTLY ROTATING VALVE IN THE ABUTMENT
Filed March 16, 1943   6 Sheets-Sheet 5

Inventor
Irving H. Selden
By

Attorney

Patented Apr. 8, 1947

2,418,793

UNITED STATES PATENT OFFICE 2,418,793

ROTARY ABUTMENT INTERNAL-COMBUSTION ENGINE WITH INDEPENDENTLY ROTATING VALVE IN THE ABUTMENT

Irving H. Selden, Tacoma, Wash.

Application March 16, 1943, Serial No. 479,302

9 Claims. (Cl. 123—13)

This invention relates to expansion engines and refers particularly to that type of engine having a rotary piston mounted on a rotor and moving in an annular channel or chamber.

The primary objects of my invention are to develop an engine having a higher horse-power-to-weight ratio and to provide such an engine of extreme compactness, both of said objects being of great importance in the design of power units adapted to meet modern requirements.

Further objects are to provide an almost frictionless engine which can therefore attain a rate of rotation up to 1800 revolutions per minute; and an engine which is provided with sufficient piston displacement to be of practical use in modern power requirements; to provide means for increasing the efficiency and length of the compression and of the power strokes; to provide means for permitting the swiftly moving pistons to pass the abutments with perfect coordination; to provide means for continuously moving the abutments without any change in rate or direction of motion; to provide a short, efficient, means of communication between the abutment ports in the compression unit and the explosion chamber; to provide means for extending the time during which the pistons are in direct communication with the explosion chambers, thereby insuring an increased efficiency in the use of the high pressure therein; to provide means for utilizing the expansion of the hot gases after such direct communication has been cut off; to provide means for scavengering the unused gases after each explosion and before fresh compressed gases are admitted to the explosion chamber; to provide means for exhausting used gases, and also to provide intake passages of great volume through the rotor thus reducing gas friction and increasing the efficiency of these operations; to provide a rectangular piston traveling in an annular channel of rectangular section and of such proportions as to be unaffected by the expansion of the several parts, and consequently not requiring any lubrication; and to provide an engine of great simplicity of construction and of high efficiency.

I attain these and other objects by the devices, mechanisms, and arrangements illustrated in the accompanying drawings, in which—

Similar numerals of reference refer to similar parts throughout the several views.

My improved engine may be briefly described as follows:

The engine may be considered as divided into two tandemly arranged parts, separated by a gear which is mounted on the common shaft and which meshes with the gears which turn the several operating units, hereinafter described. In this engine each said tandem part comprises a rotor mounted on the common shaft and each having two pistons thereon, and these pairs of pistons travel, respectively, in the compression and expansion chambers of the said parts. The rotors are not at identical angles but the compression rotor is set 22° in advance of the expansion rotor. A series of five operating units are arranged around the rotors, each such unit being rotated by the gear and lying parallel with the axis and joining the two tandem parts.

These operating units divide the compression and expansion chambers into five equal parts by means of rotating cylindrical abutments, and successively receive the compressed gases from the compression rotor, transfer them through valves to the explosion chamber therein, where said charge is exploded while the said explosion chamber is completely closed, and then release the burnt out gases, which are at very high pressure, into the expansion rotor where they engage and drive the piston passing that particular abutment. The engine therefore receives ten impulses per revolution of the main shaft since each of the two pistons receives an impulse when it has passed each of the five abutments.

In designing an engine for aeronautical uses it is important to keep down its gyroscopic action on the aircraft and this I have been able to do by having the main rotors of light construction and of small radius of gyration. The engine illustrated in the drawings has the pitch circle of the pistons and of the gear of 20 inches in diameter, and therefore the diameter of the rotors is 18 inches.

One of the advantages attained by a machine of this type is found in the fact that the piston displacement can be greatly increased while keeping the size of the engine relatively small and by the total elimination of heavy reciprocating parts, as in the ordinary reciprocating engine.

Engines of this type have usually exposed their pistons to the direct explosive force of the gases and therefore the speed of the pistons could not be greater than the speed of the flame of combustion which is determined to be about 65 to 70 feet per second, but this engine is designed so that the explosion takes place in a closed combustion chamber and does not release the resulting gases until the combustion is complete and therefore will drive the pistons at about 160 feet per second, or over 9000 feet per minute, without any change in velocity or direction, while the piston speed of an ordinary reciprocating engine has to vary from 0 to 3000 feet per minute twice each reciprocation.

Among the problems connected with the rotor type of engine is that of preventing waste of power due to the difficulty of making a gas-tight fit between the several pistons and the chambers in which they travel, and this problem is very real in machines where the piston speed is low, but it is believed to be more apparent than real in this engine since the speed of the pistons in the chambers of a twenty inch engine turning 1800 revolutions per minute would approximate 9500 feet per minute or about three times the speed of a reciprocating engine, hence it is believed that it is unnecessary to make the pistons gas tight in the chambers and a sufficient clearance may be provided in order to take care of the expected expansion of the piston under the high heat of the exploded gases, thus saving more power by the elimination of friction than is lost by the leakage of the gases around the edges of the several pistons. This same sufficient clearance eliminates any need for lubrication in the annular chamber in which the piston moves.

This clearance does not have to be as great on the suction-compression unit of the engine as the heat generated will be much less than on the expansion-exhaust unit. This fact also permits the suction-compression unit to be air-cooled while the expansion-exhaust unit should be liquid-cooled, as shown in the drawings.

Figure 1:
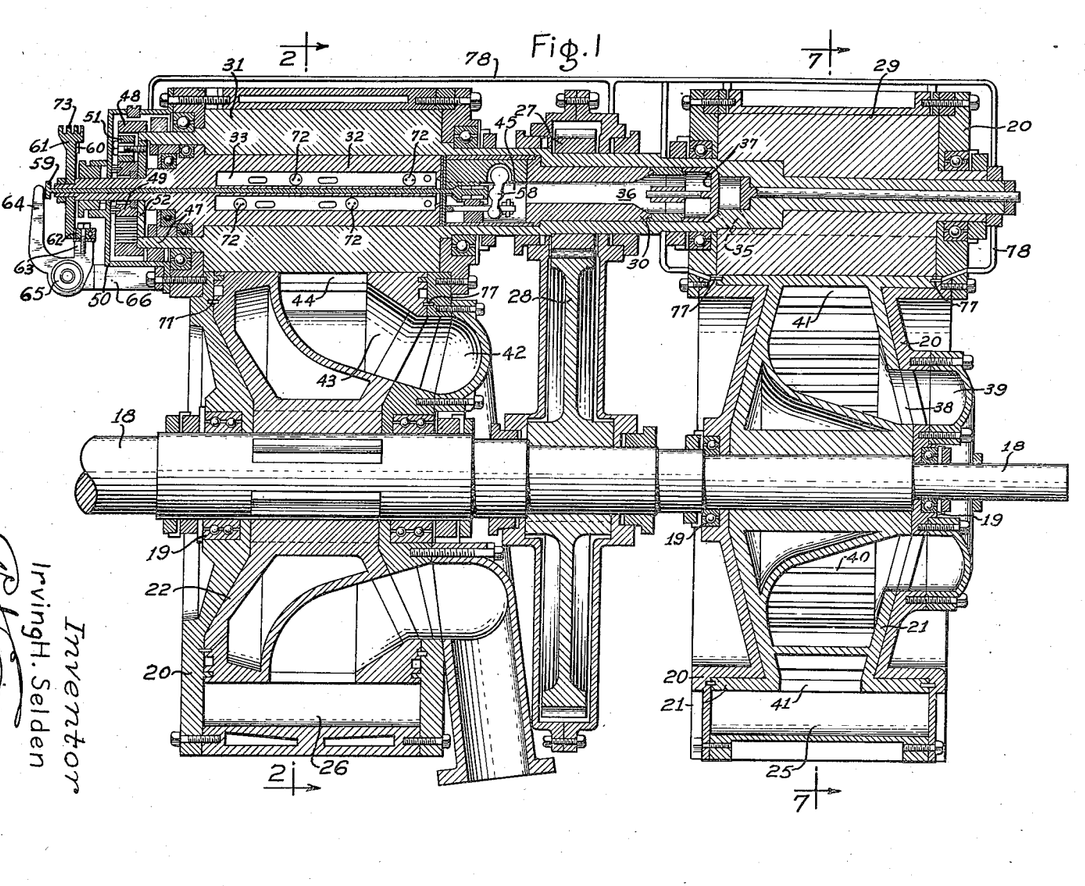
Fig. 1 is a longitudinal section of my improved engine taken on the line 1—1 in Fig. 2.
Figures 2, 3, 4, 5, 6:
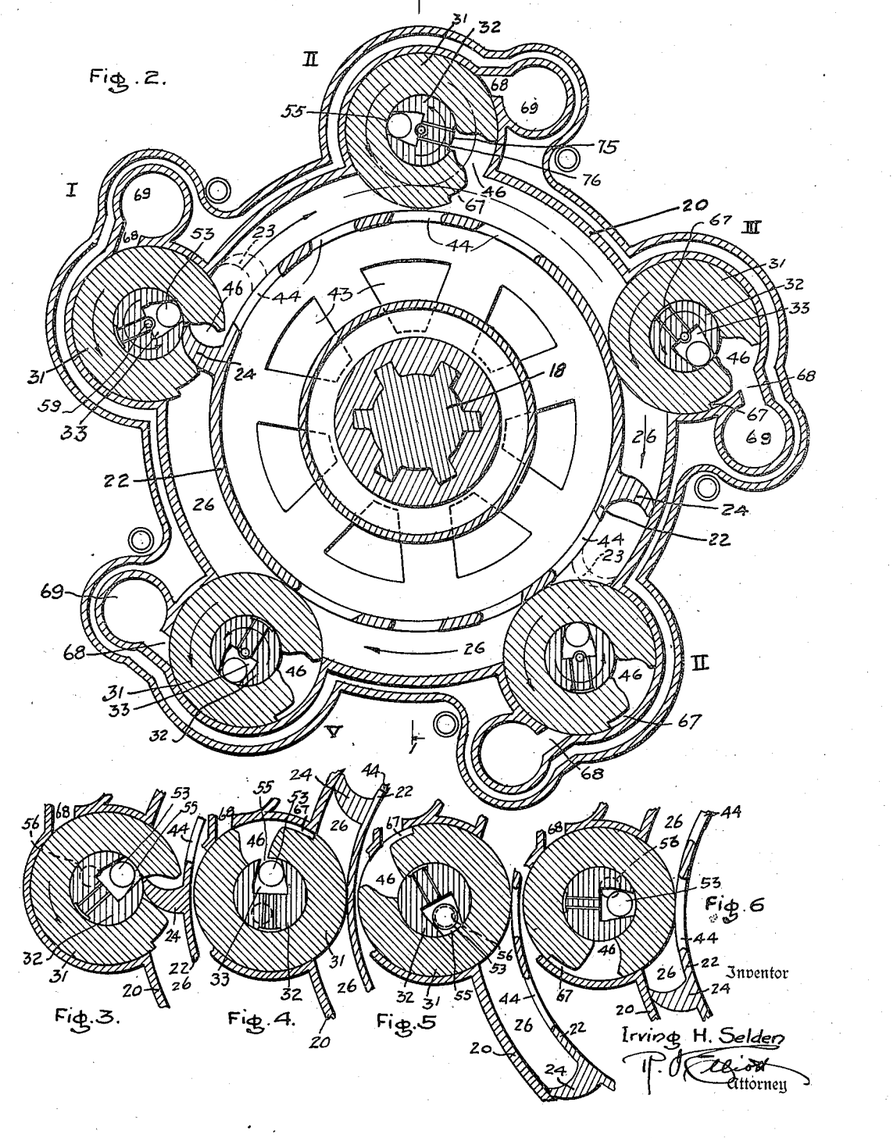
Fig. 2 is a cross-section of the power unit made on the line 2—2 in Fig. 1.
Figs. 3, 4, 5 and 6 are cross-sections of one of the rotating abutments containing the relatively rotating combustion chamber and showing the relation of the passing piston to the abutment and also the relative movements of the valve ports in the transfer chamber and in the combustion chamber.

The main shaft 18 (Fig. 1) is suitably mounted in bearings 19 in the frames 20 of the engine, and carries the two rotors, the compression rotor 21 (Fig. 7) and the expansion rotor 22 (Fig. 2). Each rotor has two pistons 23 and 24, respectively, extending outward therefrom. These pistons are integrally secured to the said rotors at diametrically opposite positions and are preferably rectangular in projected form and fit, with suitable clearance, in the two coaxial channels which form the chambers 25 and 26 formed in the two frames 20 of the engine. As viewed in the drawings, the right-hand end of the engine is the suction-compression unit and the left-hand end is the expansion-exhaust unit.

Also, as seen in Fig. 1, it will be observed that the gas check rings 77 are inserted between the rotors 21 and 22 and the respective parts of the frame 20, to prevent any leakage of gas from the chambers 25 and 26 towards the axis of the engine. These and other parts requiring oil are lubricated by a suitable flow of oil under pressure, supplied to the several parts by the oil pipe 78.

At a series of positions uniformly arranged around the two frames 20, five in this instance (Figs. 2, 7, 8) are positioned the rotary operating units which are each provided with coaxial gears 27 meshing with the main gear 28 on the shaft 18 (Fig. 1) and which drives them all at a speed ratio of four to one. These units are separately identified by the roman numerals, I, II, III, IV and V for later description.

Each of the operating units comprises a rotating cylindrical composite body, of varying diameters, extending parallel with the shaft 18, from end to end of the machine, and mounted in suitable bearings within the appropriately shaped parts of the frame 20, and is composed of the abutment 29 for the compression chamber 25, at the right end, a transfer chamber body 30, at the center, the abutment 31 for the expansion chamber 26, at the left end, and a separately driven coaxial, relatively rotating, central body 32, within the expansion abutment 31 and containing the explosion chamber 33.

The compression end of each operating unit is provided with a cylindrical enlargement (Figs. 1, 7, 11) secured thereto and forming the abutment 29 for the compression chamber 25, formed in the frame 20, thereby dividing the compression channel into five equal parts. An opening, or cavity 34 is formed in the periphery of each said abutment 29 to receive the compressed gases and timed to permit the pistons 23 on the compression rotor 21 to pass the said abutment. A passage 35 (Fig. 7III) leads from this cavity to an axial transfer chamber 36 (Figs. 1, 7, 11, 15) in the body 30. A spring-resisted check valve 37 (Fig. 1) is placed in the entry end of each of said transfer chambers 36, to prevent the compressed gases from flowing back towards the compression rotor 21. As above stated the abutment 29 makes four turns on its axis to each revolution of the shaft and, since the rotor has two pistons extending from it, it follows that the abutment makes two turns for each piston.

Figure 7:
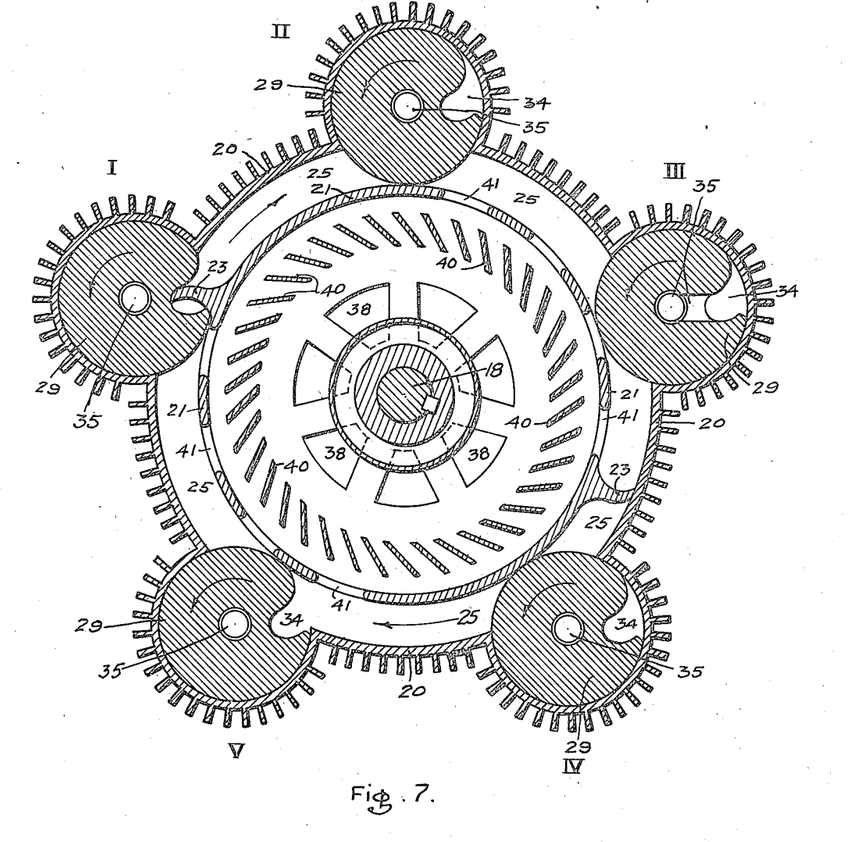
Fig. 7 is a cross-section of the intake-compression unit of my improved engine, taken on the line 7—7 in Fig. 1, the rotor being shown with one piston in the act of passing an abutment and not in its position of 22° in advance of the position of the power rotor as shown in Fig. 2.
Figure 8:
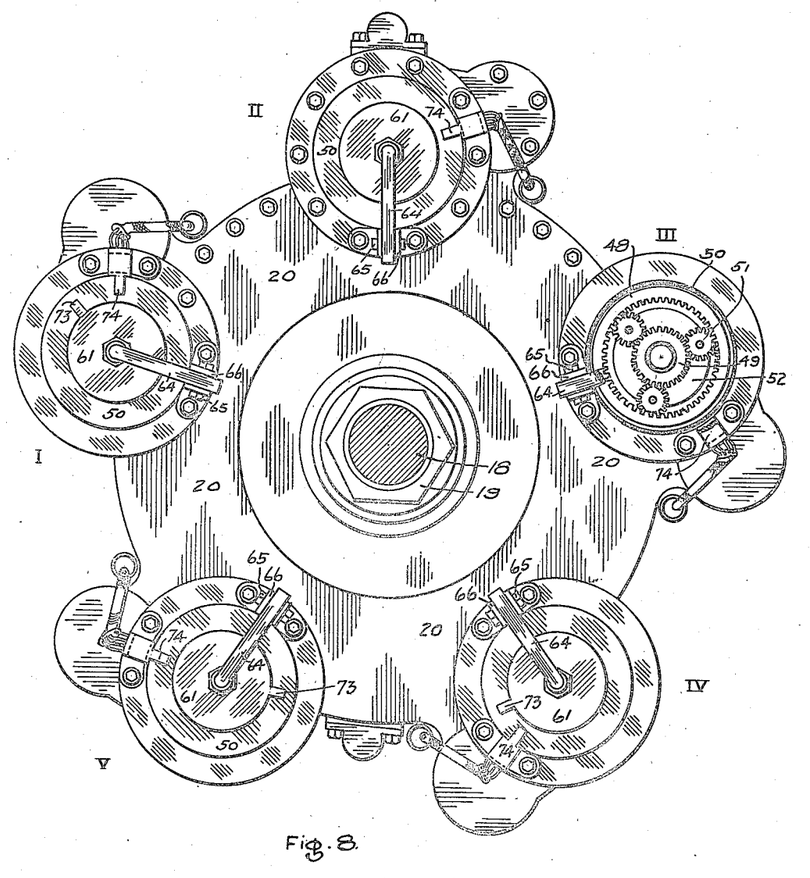
Fig. 8 is an end elevation of the power unit of my engine, showing the cover of one operating unit removed to expose the planetary gears connecting the rotating abutment with the relatively rotating explosion chamber.

The rotor 21 of the suction-compression unit is provided with suitable intake openings 38 (Figs. 1, 7) connecting it with the intake manifold 39; suitable fan blades 40; and suitable intake ports 41 in its periphery, said intake ports 41 being positioned behind the respective pistons 23 and extending therefrom slightly more than one-half way to the complementary piston 23. Thus the vapor from the carburetor (not shown) is drawn into the annular compression chamber 25 by the suction of the passing piston 23 and by the said fan blades 40. When the next piston passes an abutment 29 its forward side compresses the vapor between it and the next succeeding abutment until the second abutment 29 has turned on its axis sufficiently to expose its cavity 34 and permit the compressed charge to pass through the cavity 34 and past the check valve 37 into the transfer chamber. As seen in Fig. 7V, this cavity 34 is also open to receive the gas from the chamber 25 before the piston reaches that particular compartment of the compression channel, and makes one complete revolution before the piston 23 reaches it to force the charge into it.

The expansion-exhaust unit of the engine also comprises the rotor 22 (Figs. 1, 2) mounted on the main shaft 18 and supplying power thereto. A main exhaust manifold 42 connects with the exhaust passage 43 in the rotor 22 leading from the exhaust ports 44 formed in the periphery of the said rotor 22 on the forward side of the two pistons 24. The ports 44 extend in front of the pistons 24 for a distance of about 110° as shown in Fig. 2.

The two pistons 24 are similar in dimensions but slightly different in shape from the pistons 23 which travel in the compression channel 25, as hereinafter described. They are positioned 22° behind the corresponding pistons of the compression unit and they fit with sufficient clearance in the expansion channel 26.

The left-hand end of each of the five operating units is of compound construction. The above described axial transfer chamber 36 has a valve chamber 45 (Figs. 9, 15) at its left end, and this valve chamber turns with the driven cylindrical body 30 in which the transfer chamber 36 is located. The expansion unit abutment 31 also turns with the said parts and corresponds with the abutment 29 of the compression unit. It fits in the expansion channel 26 formed in the left-hand part of the frame 20, in which the pistons 24 of the rotor 22 travel. These abutments 31 divide the said channel 26 into five expansion-exhaust chambers. Each abutment is provided with a suitably formed passing slot 46 which permits the pistons 24 to pass the said abutment and which forms the passage for the outlet of the exploded gases from the explosion chamber 33. This slot 46 is especially shaped, as hereinafter described, and extends through the abutment 31 from the outside to its central bore. The said abutment 31 is therefore axially hollow and contains on its axis a cylindrical body 32 which has the explosion chamber 33 formed therein.

Figures 9, 10, 11, 12, 13, 14:
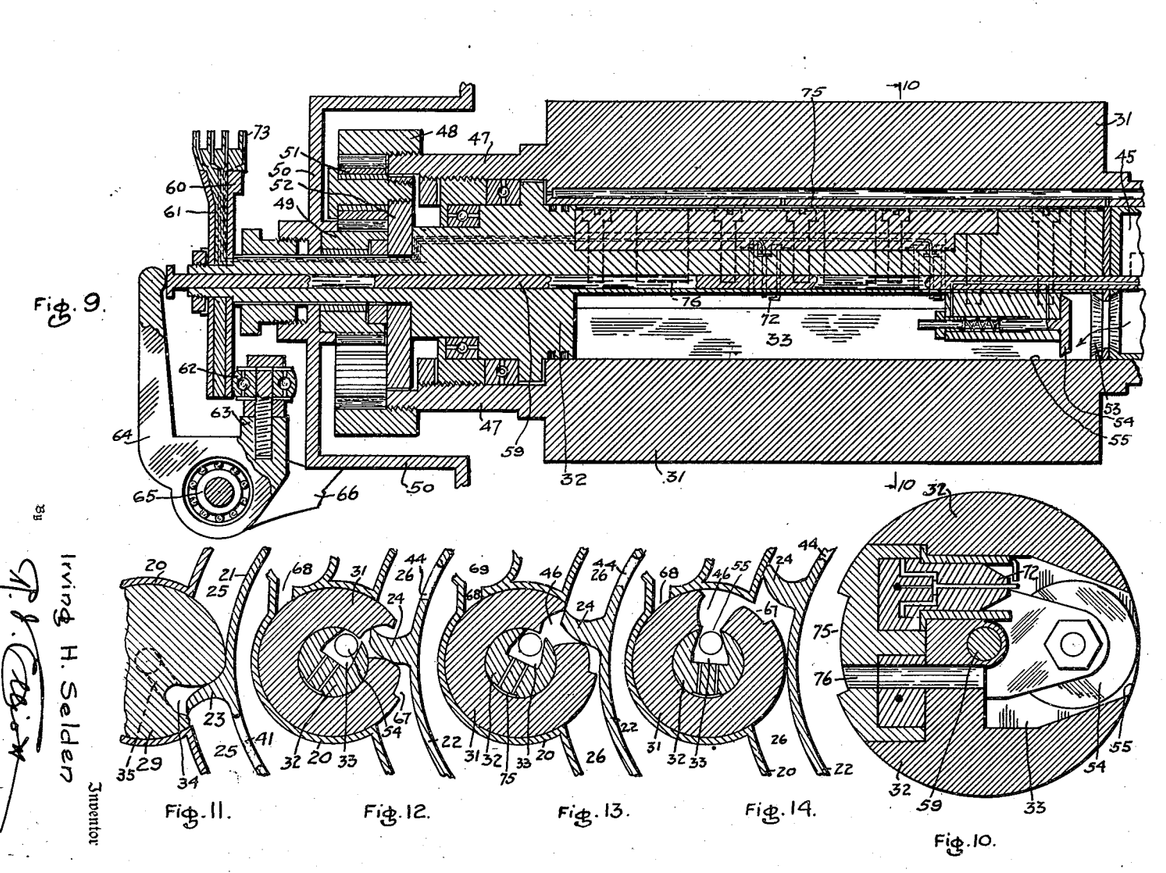
Fig. 9 is a longitudinal section, drawn to a larger scale, showing the rotating abutment, the relatively rotating explosion chamber, the spring-actuated check valve, and the mechanism operating the ignition and the transfer valve.
Fig. 10 is a cross-section of the rotating explosion chamber, taken on the line 10—10 in Fig. 9.
Fig. 11 is a cross-section of a part of the compression unit, showing the compression piston passing an abutment thereof.
Figs. 12, 13 and 14 are cross-sections showing the power piston passing its abutment and taking the force of the exploded and expanding gases thereon.
Figure 15:
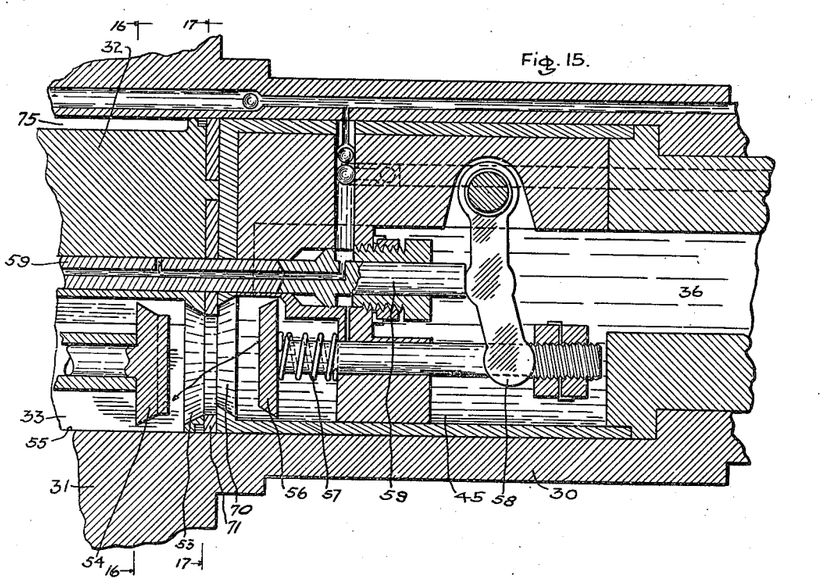
Fig. 15 is an enlarged longitudinal section showing the valve and passages connecting the transfer chamber with the explosion chamber at the moment when such communication is open.

The cylindrical bodies 32 are suitably mounted in bearings in the abutments 31 and are separate and independent thereof but fit therein sufficiently neatly to act as valves for the explosion chambers therein. Each of these five explosion chamber bodies 32 rotates in its abutment 31 at one-half the rate that the surrounding abutment 31 rotates, being driven thereby by a set of floating planetary gears on the outside of the machine. As seen in Figs. 1 and 9 the abutment 31 has an annular extension 47 to which a ring gear 48 (Figs. 1, 8, 9) is firmly attached. Also it will be seen that a fixed pinion gear 49 is attached to that part of the frame 20 which forms the gear box 50. A set of three floating gears 51 are meshed with both the above gears 48 and 49, said gears 51 being mounted on a ring 52. This ring 52 is suitably attached to and turns the body 32, which therefore rotates at one-half the rate of the abutment 31.

The explosion chamber 33 is provided with an entry port 53, with a spring-closed valve 54 therein, at the end adjacent to the above valve chamber 45 (Figs. 9, 15), and is open along one side, said opening 55 forming the outlet port for the exploded gases in said explosion chamber, and being adapted to connect with the slot 46 in the abutment 31 when the two said openings are in alinement, whereby the exploded gases are permitted to escape into the expansion chamber 26 behind the piston 24 as it passes the abutment. The above entry port 53 is not concentric with the explosion chamber body 32 but is located as far as practicable from such axis, and registers once every revolution of the body 32 with a cam-operated valve 56 located in the above-mentioned valve chamber 45 of the transfer chamber 36. This cam-operated valve 56 is operated, against the action of a spring 57, when the entry port 53 registers with it. The valve 56 is opened by a rocker arm 58, actuated by a push rod 59. The rod 59 is axially mounted in the explosion chamber body 32 and is actuated by a cam-lug 60 mounted on the ignition disk 61, which is secured to and rotates with the explosion chamber body 32. The cam-lug 60 engages the antifriction roller 62 on the short arm 63 of the lever 64. This lever 64 is pivoted at 65 to a bracket 66 secured to the frame 20 adjacent to the gear box 50. The other arm of the bell-crank lever 64 engages the end of the push rod 59 to actuate it longitudinally and thus to open the valve 56 to admit a fresh charge of compressed gases from the transfer chamber 36 to the explosion chamber 33.

Referring now to the shape of the pistons and of the openings in the abutments. As seen in Figs. 7 and 11 the pistons 23 of the compression rotor 21 have their forward surfaces inclined rearward and convex in shape while their rearward surfaces are strongly concave in shape. The purpose of this feature is to make a snug fit on entering the opening 34 and efficiently trap and compress the gas in the channel 25 and impel it into the transfer chamber 36 and at the same time draw in fresh gases from the ports 41 in the rotor 21 to fill the compression channels 25 immediately to the rear of each piston 23.

As seen in Fig. 1 the cross-section of the compression channel 25 is rectangular in form, being assumed to be about two inches deep and ten inches wide, and the pistons 23 substantially fit therein, sufficient clearance being provided to allow for expansion. It will be noticed that the pistons 23 and 24 are mounted on the rims of the two rotors 21 and 22, which therefore support the said pistons for their full width, hence when the engine is running at maximum heat there will be no gas leak under the piston due to differential expansion between the rotor and the frame.

The forward curved surface of the two pistons 23 are shaped similar to the driving surface of a tooth in a gear wheel, while the contacting surface of the opening 34 in the abutment 29 is complementary thereto or shaped similar to the driven surface of a tooth in a gear wheel of one-fourth the pitch diameter of the piston on the rotor, so that these two surfaces contact closely with a sliding motion as the piston 23 passes the abutment 29 (Fig. 7I). The rearward surface of the piston 23, as before stated, is concave in form to allow sufficient clearance as the piston 23 leaves the opening 34 in the abutment.

It will be seen in Fig. 7 that all the abutments 29 are in the same position relative to the horizontal and yet they mesh accurately with the two pistons 23 as they pass. Since there are five abutments they are spaced 72° apart in relation to the center of the rotor 21. These abutments turn four times as fast as the rotor, therefore they turn 288° while the rotor is turning 72°, but the abutments are 72° apart, therefore, in relation to the horizontal, they are 288° plus 72° or one full turn, and therefore they are at all times in corresponding positions, as shown.

Referring now to Figs. 2–6, 10, 12–14, inclusive, in which the power pistons 24 and the abutments 31 and the explosion chamber body 32 are illustrated. The axes of the said abutments 31 are the same as those of the above described abutments 29, and since the rotors 21 and 22 are mounted on the same shaft 18 and the common gear 18 drives the two abutments, it follows that all the five openings or slots 46 are in the same positions in relation to the horizontal, as above described. The pistons 24 are, however, of substantially the reverse shape as the above pistons 23, having their forward or exhaust sides concaved and their rearward or working sides convexed and shaped similar to the back of a tooth in a gear wheel, while the cooperating surface of the slot 46 has a complementarily shaped surface. Thus it will be seen that the pistons 23 make close sliding contact with the abutments 29 while entering the cavity therein and that the pistons 24 make a similar sliding contact with the abutments 31 when leaving the slot 46, thus in each case closing off the higher pressure area from the lower pressure area. It will be observed that the abutment 31 is provided with a channel 67 connected to the rear of the slot 46. The purposes of this channel 67 are readily seen in the drawings. In the first place, as seen in Fig. 14, it gives additional time for the exploded gases to pass from the explosion chamber 33, through the slot 46, and engage the rear surface of the piston 24; also, as seen in Figs. 4 and 5, it gives a longer contact with the auxiliary exhaust port 68 which is adapted to carry off the unused exploded gases from the explosion chamber 33 and the slot 46.

This auxiliary exhaust port 68 is formed in that part of the frame 20 which encloses the abutment 31, at a point about 135° ahead of the radial from the center of the shaft 18 and is adapted to receive the unused gases as above stated. Since, if the engine shaft 18 is turning 1800 revolutions per minute, or 30 per second, the slot 46 will make 120 turns per second, and the explosion chamber 33 will make 60 turns per second. This high rate of rotation has two major effects, (1) it causes the fresh gases in the explosion chamber to swirl thus increasing the speed of complete combustion and (2) it produces a highly centrifugal effect on the burned out gases remaining in the explosion chamber after the working gases have left it, which will drive out or scavenger substantially all the remainder of the gases through the said auxiliary exhaust ports 68. These ports 68 open into the auxiliary exhaust passages 69 leading to the main exhaust manifold 42.

The explosion chamber body 32 is particularly illustrated in Figs. 1, 9, 10 and 16. It comprises a cylindrical body having the explosion chamber 33 cut therein on one side and connecting at one end with the valve chamber 45 (Fig. 15) by way of the port 53 controlled by the check valve 54, while its port 55, which may be about one inch across and ten inches long, is adapted to be closed by the inner wall of the abutment 31 in which it rotates, or opened into the slot 46 therethrough.

Figure 17:
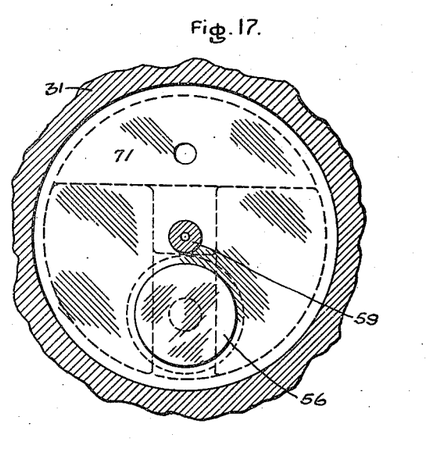
Fig. 17 is a cross-section showing the gas check plate and the cam-operated transfer valve, and taken on the line 17—17 in Fig. 15.

The gas fuel is admitted to the explosion chamber under the following conditions. As above stated, the ignition disk 61 turns with the explosion chamber body 32 at one-half the rate of the abutment 31 and the valve chamber 45. The abutment has a valve port 70 controlled by the cam-operated valve 56, which is located near the periphery of the valve chamber 45. This valve port 70 registers with the entry port 53 once every two revolutions (Fig. 15) and is automatically opened, as above described, and permits the transfer of the compressed gases from the transfer chamber 36 and the valve chamber 45 to the said explosion chamber, pushing the check valve 54 therein open. A gas check plate 71 (Figs. 15, 17) lies between the end of the valve chamber 45 and the adjacent explosion chamber body 32, and turns with the said body 32 but is allowed a slight longitudinal motion, and has a port corresponding with the entry port 53. The explosion in the chamber 33 forces this plate 71 against the end of the valve chamber 45 thus preventing escape of flame into the transfer chamber 36.

The explosion chamber 33 is provided with suitable spark plugs 72 (Figs. 1, 9 and 10) connected eletrically with the wiper 73, extending from the ignition disk 61, which turns with the explosion body 32. Four such spark plugs are provided, distributed along the length of the explosion chamber, to insure complete combustion within the time space of 0.0025 second, so that when the gases are released on the piston their action is purely expansive without any further combustion. The wipers 73 contact, momentarily, with the fixed electric terminals 74, as they pass, said terminals being suitably energized.

Figure 16:
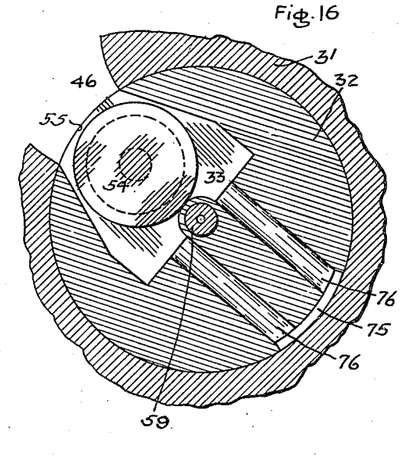
Fig. 16 is a cross-section of the explosion chamber, taken on the line 16—16 in Fig. 15 and showing it in the position when the exploded gases are being fully released to the expansion chamber.

On account of the high pressure of the exploded gases confined in the chamber 33, against the inner wall of the abutment 31, before the gases are released through the port 55 and the slot 46, it is necessary to provide a balancing force on the opposite side of the body 32, by means of a groove 75 of corresponding size with the port 55, and opposite thereto, and connected to the explosion chamber by passages 76 (Figs. 9, 10 and 16).

Referring now to Figs. 5 (and 15) and 6, attention is called to the fact that when the automatic valve 56 is opened, the ports 70 and 53 are momentarily in alinement, but that when the explosion chamber has reached the position shown in Fig. 6, the port 70 has moved out of the range of the said port 53, thus closing this connection between the two chambers 45 and 33. When the explosion chamber 33 has turned 57° from the position shown in Fig. 5 (substantially that shown in Fig. 6) the ignition wiper 73 contacts the terminals 74 and the vapors in the explosion chamber 33 are exploded. The exploded gases are confined momentarily in this chamber 33. When the parts have turned to the positions shown in Figs. 2I and 3, the port 55 is opening because the abutment slot 46 travels twice as fast as the said port 55. Therefore the gases are permitted to escape from the chamber 33 through the slot 46 and to engage the rear side of the piston 24 as it passes in the slot 46. This connection between the port 55 and the slot 46 is maintained through the positions shown in Figs. 12, 14, 15 and 4.

As the piston travels through the positions shown in Figs. 12–14 it has direct communication with the explosion chamber 33 but this connection is cut off as it reaches the position shown in Fig. 4, after which the expansion of the gases in the expansion chamber 26 between the abutment 21 and the piston 24 drives the piston forward (Figs. 2III and 2V).

Meantime the gases remaining in the slot 46 and the explosion chamber 33 are exhausted therefrom through the auxiliary exhaust port 68 (Figs. 4 and 2III). When the piston 24 has reached the next succeeding abutment, the parts are in the positions shown in Fig. 2V and the expansion has ceased and the exhaust step is about to begin. Then the slot 46 connects with the evacuated chamber 26, exhausting what gases may remain therein through the chamber 26 and the exhaust ports 44 in the periphery of the rotor 22.

As the parts turn into the positions shown in Fig. 2II, the working gases in the expansion chambers on both sides of the abutment are well evacuated and any remaining burnt out gases in the explosion chamber 33 are allowed to escape through the passages 76 and groove 75 and the slot 46, and this condition continues almost to the position shown in Fig. 5. Then the valve 56 is automatically opened, as above described to again fill the explosion chamber 33 with compressed gases from the transfer chamber 36. At this time the expansion chambers 26 on each side of the abutment 31, are still being evacuated. The parts then pass to the positions shown in Fig. 2IV while the explosion chamber 33 is being filled preparatory to passing to the position shown in Fig. 6, when the explosion takes place to repeat the above cycle.

It is, of course, understood that many variations may be made in the details of construction of my improved engine without departing from the spirit of my invention as outlined in the appended claims.

Having, therefore, described my invention, what I claim and desire to secure by Letters Patent is:

1. In an internal combustion engine having an expansion channel, a rotor closing said channel, and pistons on the rotor and traveling in said channel, the combination of a rotating abutment in said channel; a slot therein adapted to mesh with each said piston as it passes said abutment; an independently rotating body within said abutment and coaxial therewith and having an inner chamber containing burnt out gases at high pressure; a port in the side of inner chamber and normally closed by said abutment but adapted to register with said slot, whereby said gases are released from said chamber as each said piston passes said abutment.

2. An internal combustion engine as set forth in claim 1, together with means connecting said rotor with said abutment, whereby said abutment makes twice as many turns as there are pistons on the rotor for each turn of the rotor; and together with means connecting the abutment with said inner chamber body whereby said abutment rotates twice as fast as said body and inner chamber; and whereby each piston as it passes an abutment receives an impulse from the high pressure gases released from said inner chamber.

3. In an internal combustion engine having a frame with an expansion channel, a rotor closing said channel and a piston on said rotor and traveling in said channel, the combination of a rotating abutment mounted in said frame and extending into said channel and into engagement with said rotor; an auxiliary exhaust port in said frame; a slot in said abutment and adapted to mesh with said piston as it passes said abutment and then to register with said exhaust port; a cylindrical body fitting within said abutment and coaxial therewith and having an inner chamber containing burnt out gases at high pressure, and rotating one-half as fast as said abutment; a port in the side of said chamber, normally closed by said abutment but adapted to register with said slot when said piston is passing said abutment to release the high pressure gases through said slot to engage said piston, and when said slot is passing said auxiliary exhaust port to release the gases remaining in the chamber and slot; a balance groove in said body positioned opposite to the port thereof and connected by a passage to said inner chamber and adapted to register with said slot when said slot is passing said auxiliary exhaust port to exhaust the gases from said chamber.

4. In a rotary compression unit having an enclosing frame; a hollow rotor mounted therein; means for rotating said rotor; an intake manifold on one end wall of said frame and having an annular opening therethrough concentric with said rotor; intake ports in the adjacent end wall of said rotor, adapted to admit fresh charges into the interior of said rotor from said intake manifold; fan blades in the interior of said hollow rotor and adapted to draw fresh charges into said rotor and to compress them therein; and openings in the periphery of said rotor adapted to deliver such fresh charges to means for further compressing said charges.

5. In a rotary compression unit having an enclosing frame; a hollow rotor mounted therein; means for rotating said rotor; a compression chamber in said frame; an intake manifold on one end wall of said frame and having an annular opening therethrough concentric with said rotor; intake ports in the adjacent end wall of said rotor, adapted to admit fresh charges into the interior of said rotor from said intake manifold; fan blades in the interior of said hollow rotor and adapted to draw fresh charges into said rotor; and openings in the periphery of said rotor adapted to deliver such fresh charges to the suction side of said compression chamber.

6. In a rotary combustion engine having a frame; a shaft mounted in said frame; two rotors mounted on said shaft and having fixed pistons extending outward therefrom; two channels in said frame, each concentric with said shaft and enclosing the respective rotors and their pistons; two coaxial cylindrical abutments mounted in tandem in the frame and projecting into the respective channels; said abutments being secured together by an intermediate cylindrical body and having slots adapted to permit said pistons to pass; gears on said shaft and cylindrical body whereby said abutments are rotated in coordination with said rotors; a receiving passage in one said abutment, connected to the slot therein; a valved transfer chamber in said body and connected to said passage; and a valved explosion chamber in the other abutment and adapted to be intermittently and alternately connected with the transfer chamber and with the slot in said second abutment when the piston of the second rotor is fully within and passing through said slot.

7. In a rotary engine having an expansion channel, a rotor closing said channel, and pistons extending therefrom and traveling in said channel, the combination of a plurality of rotating abutments mounted in the frame and projecting into said channel to divide said channel into sections; means connecting said rotor and said abutments whereby their rotation is coordinated; slots in said abutments adapted to mesh with each said piston as it passes said abutment, with sliding contact, whereby connection between the sections on each side of the abutment is cut off while said slot is engaged by said pistons; an independently but coordinately rotating body within each said abutment and coaxial therewith, having an inner chamber containing vapor at high pressure; and a port in the side of said inner chamber and normally closed by said abutment, but adapted to register with said slot whenever each piston is fully in said slot, whereby the vapor is released from said chamber to engage the rear side of said piston, and whereby the effective stroke of said piston begins while the piston is still in the slot.

8. In the expansion unit of a rotary combustion engine, having an annular channel, the combination of an abutment adapted to rotate therein in fixed position; means to rotate said abutment in coordination with the engine; a cylindrical body mounted coaxially in said abutment and having an inner chamber containing gases at high pressure; a port in the side of said inner chamber and normally closed by said abutment; means for rotating said cylindrical body in the same direction but at a slower rate than said abutment; and a slot in and through said abutment and adapted to pass said high pressure gases through said abutment when said slot and said port are in open registration.

9. In an expansion unit of a rotary combustion engine having an annular channel, the combination of a rotor with a piston traveling in said channel; an abutment adapted to rotate in said channel in fixed position; means to rotate said abutment in coordination with the engine; a cylindrical body mounted coaxially in said abutment and having an inner chamber containing burning gases at high pressure; a port in the side of said inner chamber and normally closed by said abutment; gears connecting said cylindrical body with said rotating abutment whereby said port is held closed until the combustion of said gases is completed; and a passing slot in and through said abutment and adapted to pass said high pressure, completely burned, gases through said abutment when said slot and port are in open registration and when said piston is passing through said passing slot, whereby the power stroke on said piston begins while the piston is well within the passing slot.

IRVING H. SELDEN.

REFERENCES CITED

The following references are of record in the file of this patent:

UNITED STATES PATENTS

| Number | Name | Date |
|---|---|---|
| 866,693 | Southern et al. | Sept. 24, 1907 |
| 904,974 | Lee | Nov. 24, 1908 |
| 1,427,053 | Bidwell | Aug. 22, 1922 |
| 686,394 | Deiwiks | Nov. 12, 1901 |
| 1,282,518 | Althause | Oct. 22, 1918 |
| 1,311,858 | Fischer | July 29, 1919 |
| 1,193,808 | McCarthy | Aug. 8, 1916 |
| 1,268,794 | Harris et al. | June 4, 1918 |
| 1,856,839 | Macart | May 3, 1932 |
| 2,062,753 | Linn | Dec. 1, 1936 |
| 2,088,121 | Swink | July 27, 1937 |
| 668,878 | Jensen | Feb. 26, 1901 |
| 813,954 | Burlich | Feb. 27, 1906 |
| 991,680 | Winberg | May 9, 1911 |

FOREIGN PATENTS

| Number | Country | Date |
|---|---|---|
| 103,086 | German | May 29, 1899 |
| 531,961 | France | Nov. 3, 1921 |
| 305,990 | German | May 31, 1918 |
| 567,472 | France | Dec. 7, 1923 |